US008834830B2

(12) United States Patent
Tarancon, III

(10) Patent No.: US 8,834,830 B2
(45) Date of Patent: Sep. 16, 2014

(54) METHOD FOR THE PREPARATION OF ANHYDROUS HYDROGEN HALIDES, INORGANIC SUBSTANCES AND/OR INORGANIC HYDRIDES BY USING AS REACTANTS INORGANIC HALIDES AND REDUCING AGENTS

(71) Applicant: Gregorio Tarancon, III, Ft. Meyers, FL (US)

(72) Inventor: Gregorio Tarancon, III, Ft. Meyers, FL (US)

(73) Assignee: Midwest Inorganics LLC, Miami, FL (US)

( * ) Notice: Subject to any disclaimer, the term of this patent is extended or adjusted under 35 U.S.C. 154(b) by 0 days.

(21) Appl. No.: 13/769,184

(22) Filed: Feb. 15, 2013

(65) Prior Publication Data
US 2014/0070137 A1    Mar. 13, 2014

Related U.S. Application Data

(60) Provisional application No. 61/698,536, filed on Sep. 7, 2012.

(51) Int. Cl.
*C01B 7/19* (2006.01)
*C01B 7/03* (2006.01)
(Continued)

(52) U.S. Cl.
CPC .............. *C01B 7/191* (2013.01); *C01B 7/093* (2013.01); *C22B 60/0204* (2013.01); *C01F 11/22* (2013.01); *C01B 17/00* (2013.01); *C22B 34/36* (2013.01); *C01B 21/00* (2013.01); *C01B 7/135* (2013.01); *C01B 7/035* (2013.01); *C01B 7/194* (2013.01)
USPC ........................ 423/481; 423/483; 252/183.14

(58) Field of Classification Search
USPC ................................ 423/483, 481
See application file for complete search history.

(56) References Cited

U.S. PATENT DOCUMENTS

| 1,420,209 | A | 6/1922 | Paulus |
| 2,733,983 | A | 2/1956 | Daubenspeck et al. |

(Continued)

FOREIGN PATENT DOCUMENTS

| EP | 439738 A1 | 8/1991 |
| EP | 0503771 A1 | 9/1992 |

(Continued)

OTHER PUBLICATIONS

*Montreal Protocol on Substances That Deplete the Ozone Layer* Report of the Technology and Economic Assessment Panel, Apr. 2002, vol. 3B, Report of the Task Force on Destruction Technologies, paragraph 3.2 Incineration Technologies, sub paragraphs 3.2.1 Reactor Cracking and 3.2.2 Gaseous/Fume Oxidation; Table 3-1: Emissions from Reactor Cracking Process and Table 3-2: Emissions from Gaseous/Fume Oxidation Process. http://ozone.unep.org/teap/Reports/Other_Task Force/TEAP02V3b.pdf.

(Continued)

*Primary Examiner* — Peter F Godenschwager
(74) *Attorney, Agent, or Firm* — McKenna Long & Aldridge LLP

(57) ABSTRACT

A method for completely reducing an inorganic halide to obtain a non-halogen inorganic substance and/or hydride thereof and preferably anhydrous hydrogen halide fluid using inorganic halide substances, such as sulfur hexafluoride, nitrogen trifluoride, tungsten hexafluoride, uranium hexafluoride and others by reduction with a reducing agent at a proper temperature. The reducing agents may be molecular hydrogen, inorganic hydrides and inorganic metallic elements; molecular hydrogen is preferable, but in certain instances the inorganic hydrides are used, as well as inorganic metallic elements such as calcium and magnesium.

16 Claims, 1 Drawing Sheet

(51) Int. Cl.
*C01B 7/09* (2006.01)
*C09K 3/00* (2006.01)
*C22B 60/02* (2006.01)
*C01F 11/22* (2006.01)
*C01B 17/00* (2006.01)
*C22B 34/36* (2006.01)
*C01B 21/00* (2006.01)
*C01B 7/13* (2006.01)

(56) References Cited

U.S. PATENT DOCUMENTS

| | | |
|---|---|---|
| 2,984,615 A | 5/1961 | Jacob |
| 3,220,798 A | 11/1965 | Cull et al. |
| 3,445,292 A | 5/1969 | Childs et al. |
| 3,760,565 A | 9/1973 | Fish |
| 3,845,191 A | 10/1974 | Bruce, Jr. |
| 4,059,675 A | 11/1977 | Yang et al. |
| 4,229,416 A | 10/1980 | Donaldson et al. |
| 4,282,339 A | 8/1981 | Donaldson et al. |
| 4,423,024 A | 12/1983 | Wolford |
| 4,435,379 A | 3/1984 | Olsen et al. |
| 4,447,262 A | 5/1984 | Gay et al. |
| 4,631,183 A | 12/1986 | Lalancette |
| 4,654,203 A | 3/1987 | Maurer |
| 4,666,696 A | 5/1987 | Shultz |
| 4,756,899 A | 7/1988 | Jenczewski et al. |
| 4,804,560 A * | 2/1989 | Shioya et al. ............. 438/675 |
| 4,906,796 A | 3/1990 | Yates |
| 4,935,212 A | 6/1990 | Jacob |
| 4,950,309 A | 8/1990 | Schulz |
| 5,087,778 A | 2/1992 | Yates |
| 5,160,499 A | 11/1992 | Edwards |
| 5,236,671 A | 8/1993 | Grotz |
| 5,245,112 A | 9/1993 | Hoshimoto |
| 5,260,496 A | 11/1993 | Meinert et al. |
| 5,288,930 A | 2/1994 | Shields et al. |
| 5,346,684 A | 9/1994 | Mestepey |
| 5,352,428 A | 10/1994 | Bhakta et al. |
| 5,416,247 A | 5/1995 | Webster |
| 5,427,760 A | 6/1995 | Grotz |
| 5,497,627 A | 3/1996 | Heyduk et al. |
| 5,547,653 A | 8/1996 | Webster |
| 5,585,529 A | 12/1996 | Corbin et al. |
| 5,628,894 A | 5/1997 | Tarancon |
| 5,653,949 A | 8/1997 | Chen |
| 5,695,732 A | 12/1997 | Sparks et al. |
| 5,717,149 A * | 2/1998 | Nagel et al. ............. 75/398 |
| 5,744,116 A | 4/1998 | Olson et al. |
| 5,759,504 A | 6/1998 | Kanno et al. |
| 5,779,998 A | 7/1998 | Tom |
| 5,830,325 A | 11/1998 | Mahler et al. |
| 5,877,391 A | 3/1999 | Kanno |
| 5,881,359 A | 3/1999 | Slagle et al. |
| 5,965,786 A | 10/1999 | Rostaing et al. |
| 5,977,427 A | 11/1999 | Tamata et al. |
| 6,047,560 A | 4/2000 | Nishimura et al. |
| 6,069,291 A | 5/2000 | Rossin et al. |
| 6,077,482 A | 6/2000 | Kanno et al. |
| 6,239,064 B1 | 5/2001 | Nguyen |
| 6,294,709 B1 | 9/2001 | Izumikawa et al. |
| 6,350,614 B1 | 2/2002 | Heath et al. |
| 6,352,677 B1 | 3/2002 | Hage et al. |
| 6,509,511 B1 | 1/2003 | Rossin |
| 6,602,480 B1 | 8/2003 | Mori |
| 6,605,750 B1 | 8/2003 | Bessho et al. |
| 6,622,523 B2 | 9/2003 | Ludwig et al. |
| 6,652,830 B2 | 11/2003 | Wang et al. |
| 6,673,326 B1 | 1/2004 | Rossin et al. |
| 6,764,666 B2 | 7/2004 | Mori |
| 6,921,519 B2 | 7/2005 | Draper |
| 7,294,315 B1 | 11/2007 | Kanno |
| 7,435,394 B2 | 10/2008 | Kanno |
| 7,476,374 B2 | 1/2009 | Weckhuysen |
| 8,043,574 B1 | 10/2011 | Tarancon, III |
| 8,128,902 B2 | 3/2012 | Tarancon, III |
| 2001/0001652 A1 | 5/2001 | Kanno et al. |
| 2002/0074946 A1 | 6/2002 | Ikeda et al. |
| 2002/0086110 A1 | 7/2002 | Vercammen et al. |
| 2002/0111526 A1 | 8/2002 | Seeley |
| 2004/0042948 A1 | 3/2004 | Kanno et al. |
| 2004/0047784 A1 | 3/2004 | Kanno et al. |
| 2004/0191146 A1 | 9/2004 | Shinohara |
| 2005/0271568 A1 | 12/2005 | Mori et al. |
| 2006/0024226 A1 | 2/2006 | Park et al. |
| 2007/0049781 A1 | 3/2007 | Brown et al. |
| 2007/0274888 A1 | 11/2007 | Hertzler et al. |
| 2010/0286463 A1 | 11/2010 | Tarancon |

FOREIGN PATENT DOCUMENTS

| | | |
|---|---|---|
| EP | 0 748 649 A1 | 12/1996 |
| EP | 0885648 A1 | 12/1998 |
| FR | 2724806 A1 | 3/1996 |
| GB | 2 295 101 A | 5/1996 |
| JP | 61086402 | 5/1986 |
| JP | 2004105864 A | 4/2004 |
| JP | 2005040674 A | 2/2005 |
| RU | 2 120 489 | 10/1998 |
| WO | WO 94/19301 | 9/1994 |
| WO | WO 99/24358 | 5/1999 |
| WO | WO 99/28019 | 6/1999 |
| WO | WO 99/36352 | 7/1999 |
| WO | WO 01/21304 A1 | 3/2001 |
| WO | WO 2004/052513 A1 | 6/2004 |
| WO | WO 2007/099081 A1 | 9/2007 |

OTHER PUBLICATIONS

University of Pittsburg $H_2$ Production in Palladium & Palladium-Copper Membrane Reactors At 1173K in the Presence of $H_2S$, Author: Osemwengie Uyi Iyoha, prepared2007.

*Pacific Northwest Laboratory (PNL)* Destruction of Chlorofluorocarbons and Halons, PNL-SA-26159, Jun. 1995, pp. 1-7, Authors: J. M. Matchett, K. B. Miller and C. W. Purcell.

United States Environmental Protection Agency Mechanisms of Formation of Dioxin-Like Compounds during Combustion of Organic Materials http://www.epa.gov/ncea/pdfs/dioxin/nas-review/pdfs/part1_vol1/dioxin_pt1_vol1_ch02_dec2003.pdf, (Dec. 2003).

United Nations Environment Programme (UNEP) Dioxins and Furans in the Chemical Industry, pp. 1-11, Author: Dr. Arseen Seys, http://www.chem.unep.ch/POPs/POPs_Inc/proceedings/abu-dhabi/SEYS2.html, (May 2011).

Environment Canada Technical Document for Batch Waste Incineration, Apr. 2010, paragraph 2.1.3, p. 7, http://www.ec.gc.ca/gdd-mw/default.asp?lang=En&n=8A09EA04-1.

*Ecletica Quimica* Evaluation of the Dioxin and Furan Formation Thermodynamics in Combustion processes of Urban Solid Waste, vol. 32, No. 1, 2007, pp. 1-7, Author: J. C. Moreno-Pirajan et al., Instituto de Quimica/UNESP, SP Brazil, http://www.scielo.br/scielo.php?script=sci_arttext&pid=S0100-46702007000100002&Ing=en&nrm=iso&tIng=en.

*Euro Chlor* Dioxins, Apr. 2002, p. 1, http://www.eurochlor.org/upload/documents/document57.pdf.

*Office of Fluorocarbons Control Policy, Global Environment Bureau, Ministry of the Environment*, Government of Japan Guidelines on the Destruction of CFCs in Japan, Updated in Mar. 1999 www.env.go.jp/en/earth/ozone/gl199903.pdf.

United States Environmental Protection Agency Technologies for CFC/Halon Destruction, EPA/600/S7-89/01, Dec. 1, 1989, pp. 1-4, Authors: J. C. Dickerman, T. E. Emmel, G. E. Harris and K. E. Hummel, http://nepis.epa.gov/Exe/ZyPURL.cgi?Dockey=30003UR2.txt.

*ESPI Metals* High Purity Hastelloy, p. 1 Overview and p. 4 Technical Data Sheets. http://www.espimetals.com/index.php.online-catalog/378-hastelloy, (May 2011).

*Aviation Metals*, Inc. Introduction to Inconel, pp. 1-4 Specifications. http://www.aviationmetals.net/inconel.php, (May 2011).

Maeno et al. "Decomposition experiment of hydro-fluorcarbon gas by pulsed TEA CO 2 laser", Proceedings of SPIE—The International Society for Optical Engineering, V 5777, n Part II, p. 1034-1039, 2005.

(56) References Cited

OTHER PUBLICATIONS

Bessho et al. "Development of CFCs decomposition system using microwave plasma", Technical Review—Mitsubishi Heavy Industries, v 37, n 3, p. 83-87, Oct. 2000.

Rice et al. "Selective catalytic activity toward hydrofluorocarbon refrigerants in mixed oxides of manganese and copper", Applied Catalysis B: Environmental, V 24, No. 2, p. 107-120, Jan. 17, 2000.

J.W. Magee, "Halogenated hydrocarbons and their mixtures: A decade of process in calorimetry" National Institute of Standards and Technology, Physical and Chemical Properties Division, NISTIR-6620, 30p, Mar. 2002.

Nagata et al. "Catalytic oxidative decomposition of chlorofluorocarbons (CFCs) in the presence of hydrocarbons", Applied Catalysis B: Environmental 5 (1994) pp. 23-31, Elsevier Science B.V.

Environmental Science and Technology Efficient Destruction of CF4 through In Situ Generation of Alkali Metals from Heated Alkali Halide Reducing Mixtures, vol. 36, No. 6, 2002, pp. 1367-1371, Authors: Myung Churl Lee and Wonyong Chol, School of Environmental Science and Engineering, Pohang University of Science and Technology, Pohang 790-784, Korea.

Environmental Science and Technology Carbon Atom-Initiated Degradation of Carbon Tetrachloride in the Presence of Molecular Oxygen: A Product and Mechanistic Study, vol. 32, No. 20, 1998, pp. 3200-3206, Authors: Gayle Nicoll and Joseph S. Francisco, Department of Chemistry and Department of Earth & Atmospheric Sciences, Purdue University, West Lafayette, Indiana 47907-1393.

Environmental Science and Technology Heterogeneous Degradation of Carbon Tetrachloride: Breaking the Carbon-Chloride Bond with Activated Carbon Surfaces, vol. 33, No. 22, 1999, pp. 4102-4106, Authors: Gayle Nicoll and Joseph S. Francisco, Department of Chemistry and Department of Earth & Atmospheric Sciences, Purdue University, West Lafayette, Indiana 47907-1393.

Settle, Frank. "Nuclear Chemistry Uranium Production". General Chemistry Case Studies. Chemcases.com http://www.chemcases.com/nuclear/nc-06.html, (Sep. 2013).

Levy et al. "The Reduction of Uranium Hexafluoride by Hydrogen at Room Temperature". Australian Journal of Chemistry 26(12), 1973, p. 2711-2714.

"Nitrogen Trifluoride". Cameo Chemicals. http://www.cameochemicals.noaa.gov/chemical/1212, (Sep. 2013).

"Nitrogen Trifluoride". International Chemical Safety Cards. http://siri.org/msds/mf/cards/file/1234.html, (Sep. 2013).

"Nitrogen Trifluoride". Chemical Book. http://www.chemicalbook.com/ProductChemicalPropertiesCB7152340_EN.htm, ( Sep. 2013 ).

"Pauling Electronegativity Scale". Knowledge Rush. http://www.knowledgerush.com/kr/encyclopedia/Pauling_Electronegativity_Scale/, (Sep. 2013).

"Configuration energy (CE), the average one-electron valence shell energy of the ground-state free atom, is used to quantify metal-covalent-ionic bonding" J. Am. Chem. Soc. 1992, 114, 1510.

A.L. Allred. J. Inorg. Nucl. Chem., 1961, 17, 215.

Tumanov, Y.N. et al. "Mechanism of Reduction of Uranium Hexafluoride by Hydrogen". Atomnaya Energiya, vol. 32, No. 1, p. 21-25, Jan. 1972.

Kotz, John C. et al., Chemistry & Chemical Reactivity, Second Edition, 1987, Saunders College Publishing, Orlando, Florida.

Brown, Theodore L. General Chemistry, Second Edition, 1968, Charles E. Merril Publishing Company, Columbus, Ohio.

Nebergall, William H. et al., College Chemistry with Qualitative Analysis, Third Edition, 1968, p. 160, D.C. Heath and Company, Lexington, Massachusetts.

Klapotke, Thomas M., Nitrogen Fluorine Compounds. Journal of Fluorine Chemistry. vol. 127, Issue 6, Jun. 2006, p. 679-687.

Kim, Eui Song et al., Studies on the nucleation and growth of chemical-vapor-deposited W on TiN substrates. Materials Science and Engineering: B; vol. 17, Issues 1-3, Feb. 28, 1993, pp. 137-142.

Electronegativity (Pauling): periodicity. WebElements. 03 Jul. 3, 2008. p. 1-2. http://www.webelements.com/periodicity/electronegativity_pauling/>.

Periodic Table of Elements: LANL, Uranium. Los Alamos National Laboratory. Jun. 29, 2011. p. 1-2. https://web.archive.org/web/20110629030710/http://periodic.lanl.gov/92.shtml>.

\* cited by examiner

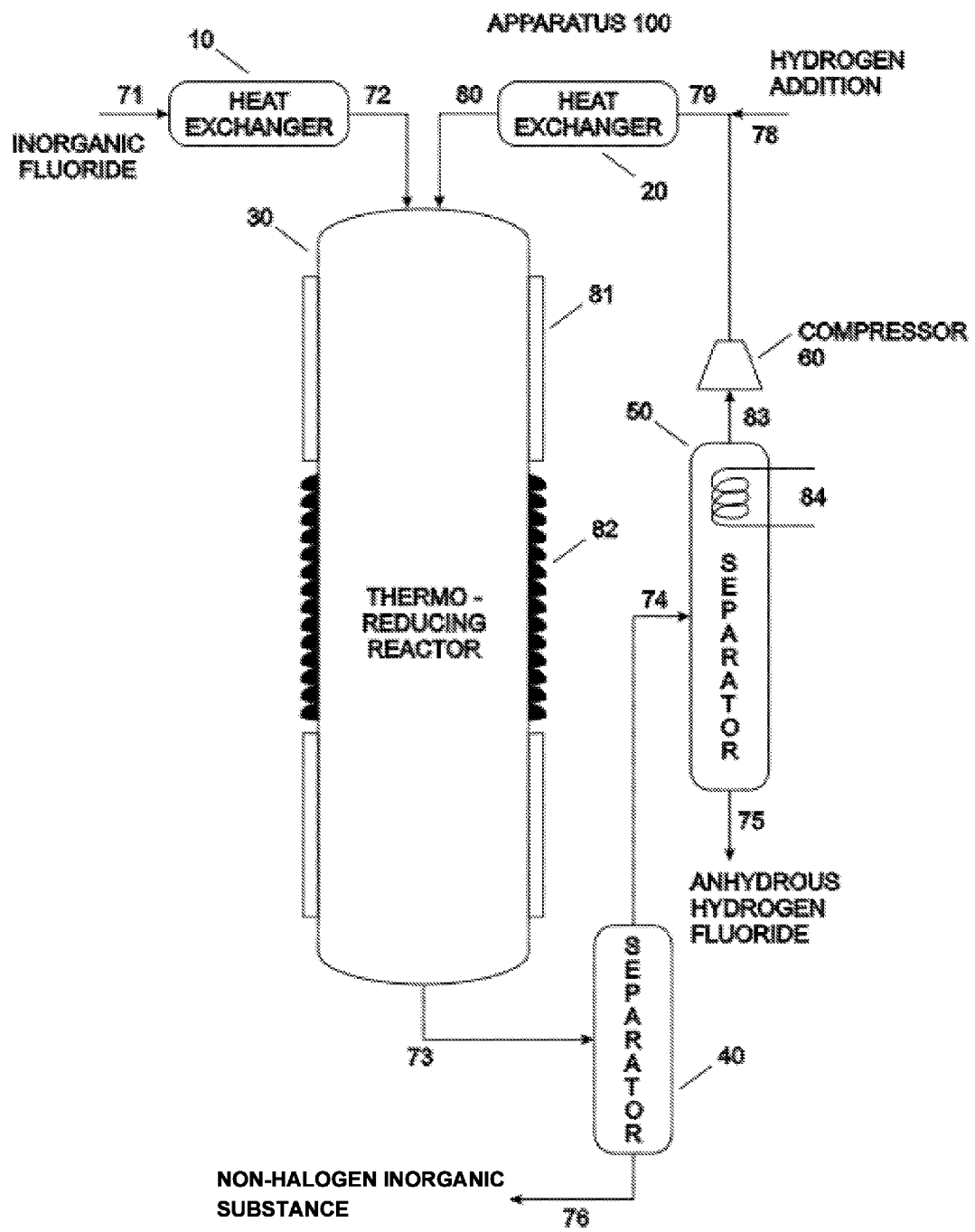

METHOD FOR THE PREPARATION OF ANHYDROUS HYDROGEN HALIDES, INORGANIC SUBSTANCES AND/OR INORGANIC HYDRIDES BY USING AS REACTANTS INORGANIC HALIDES AND REDUCING AGENTS

This application claims the benefit of U.S. Provisional Patent Application No. 61/698,536, filed on Sep. 7, 2012, which is hereby incorporated by reference for all purposes as if fully set forth herein.

BACKGROUND OF THE INVENTION

1. Field of the Invention

This invention relates to a method for the complete reduction of inorganic halides to obtain non-halogen inorganic substances and/or hydrides thereof and preferably also anhydrous hydrogen halides, by using reducing agents under temperature and pressure in a thermo-reducing reactor.

2. Background of the Invention

Hydrogen halides are very valuable substances in the chemical industry as they are the principal halogen source that can be used in various process. Hydrogen fluoride is a particularly important hydrogen halide. It is a colorless liquid at ambient temperature that provides the principal industrial source of fluorine and thus is the precursor to many important organic and inorganic fluorides.

Anhydrous hydrogen fluoride is known for its ability to diffuse relatively quickly through porous substances. For this reason, anhydrous hydrogen fluoride is typically used in the production of fluorinated substances, the so-called organic and inorganic fluorides. These materials are essentially refrigerants, pharmaceuticals, foam blowing agents, fire-extinguishing agents, solvents and raw materials for the production of fluorinated monomers for the plastics industry.

Other hydrogen halides such as hydrogen chloride, hydrogen bromide, hydrogen iodide, and hydrogen astatide have similar beneficial properties, albeit to a different degree, and thus there are various applications in which they can be employed.

There have been a number of processes developed in the art geared to the production of anhydrous hydrogen halides from halogenated inorganic substances. For example, anhydrous hydrogen fluoride from fluorinated inorganic substances. However, these processes are often very complex, are not fully efficient and can be very expensive and difficult to work.

An exemplary process relating to fluorinated substances is disclosed in International Publication WO99/36352 to Hage et al., which is incorporated herein by reference. This publication discloses a process to recover anhydrous hydrogen fluoride (AHF) from uranium hexafluoride. Particularly, Hage et al. disclose a multi-reaction system in which the uranium hexafluoride is reacted with a hydrogen fluoride/water azeotrope to produce uranium oxide. While ultimately Hage et al. provides a high yield of conversion, the system does not produce anhydrous hydrogen fluoride. Instead, Hage et al. obtains the anhydrous hydrogen fluoride only after a separation process to remove water. This additional separation step can be very costly and makes the process less efficient.

Another exemplary process involving fluorinated substances is one in which uranium hexafluoride is reacted to yield anhydrous hydrogen fluoride is disclosed by Yu. N. Tumanov et al. in "Mechanism of Reduction of Uranium Hexafluoride by Hydrogen," which is incorporated herein by reference. In this article, Tumanov et al. disclose reacting uranium hexafluoride with hydrogen to produce uranium tetrafluoride and anhydrous hydrogen fluoride. While this is a more direct production of anhydrous hydrogen fluoride, Tumanov does not provide a fully efficient mechanism. Instead, Tumanov only reduces uranium hexafluoride to uranium tetrafluoride.

The mechanism of a partial reduction of uranium hexafluoride by molecular hydrogen for the dissociation equilibrium of uranium hexafluoride is similar to the Arrhenius equation. This process is typically reached at a temperature of 1800 K, where the velocity constant of reaction is in the range of 1000-4000 K.

For all practical purposes the Arrhenius equation is a sufficiently accurate representation of data as shown, for example, in FIG. 2 of Tumanov et al.

The logarithm of velocity constant of the reaction $UF6 \rightarrow UF5+F$ versus the reciprocals of temperature is also expressed in Reaction Kinetics for Chemical Engineers by Stanley M. Walas, McGraw-Hill Book Company, Inc., 1959 (Fundamentals, 5. The rate equation, 6. Variables other than mass or concentration, 7. Effect of temperature and 8. Energy of activation.) at FIG. 1-2 plot log $kT^2$ vs. 1/T, where $kT^2=1/$sec, which document is incorporated herein by reference.

Accordingly, Tumanov provides a known mechanism for the reduction of uranium hexafluoride by hydrogen that is only a partial reduction and represents only one step of the total reduction of the uranium hexafluoride by the removal of only two fluorine atoms of the six fluorine atoms.

Thus, there is a need for an improved process in which an inorganic halide may be fully reduced to obtain a non-halogen inorganic substance and preferably anhydrous hydrogen halide. This need is equally present for all inorganic halides, but particularly important for inorganic fluoride substances.

SUMMARY OF THE INVENTION

Accordingly, the present invention is a method to completely reduce one or more inorganic halides to obtain one or more non-halogen inorganic substances and/or hydrides thereof from the one or more inorganic halides and preferably also obtain anhydrous hydrogen halide.

Exemplary embodiments provide a new method for the synthesis of anhydrous hydrogen halides and non-halogen inorganic substances using a thermo-reducing reactor in which hydrogen reacts with all of the halide portion of the inorganic halide to produce anhydrous hydrogen halide and one or more non-halogen inorganic substances.

Exemplary embodiments also provide a method to fully reduce an inorganic halide using reducing agents that include one or more of molecular hydrogen, inorganic hydride, and inorganic metallic element.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings. To achieve these and other advantages and in accordance with the purpose of the present invention, as embodied and broadly described, a method for the synthesis of anhydrous hydrogen halide and at least one non-halogen inorganic substance including fully reacting one or more inorganic halides with at least one reducing agent to produce anhydrous hydrogen halide and at least one non-halogen inorganic substance. The at least one reducing agent may include molecular hydrogen, inorganic hydride, inorganic metallic element or a combination thereof.

The inorganic hydride may include an inorganic substance that is the same as a non-halogen inorganic substance of the inorganic halide. The inorganic halides may include inorganic fluorides, inorganic chlorides, inorganic bromides, inorganic iodides, inorganic astatides or a combination thereof. Exemplary inorganic halides include sulfur hexafluoride, nitrogen trifluoride, tungsten hexafluoride and uranium hexafluoride. Where the reducing agent includes molecular hydrogen the reaction zone temperature $T_{RZ}$ may be determined using a formula as explained in further detail below.

In another aspect of the present invention, a method for the synthesis of anhydrous hydrogen fluoride and at least one non-halogen inorganic substance including reacting one or more inorganic fluorides with one or more reducing agents to produce anhydrous hydrogen fluoride and at least one non-halogen inorganic substance. The reducing agents may include molecular hydrogen, an inorganic hydride, an inorganic metallic element or a combination thereof. For example, the reducing agents may include molecular hydrogen and elemental calcium. Where the reducing agent includes molecular hydrogen the reaction zone temperature T of the thermo-reducing reaction may be determined using a formula as explained in further detail below.

In yet another aspect of the present invention, a method for reducing an inorganic halide including reacting one or more inorganic halides with one or more reducing agents to yield at least one completely reduced non-halogen inorganic substance, wherein the one or more reducing agents are selected from inorganic hydride, inorganic metallic element or combination thereof. Where the reducing agents includes an inorganic hydride, the inorganic hydride may contain a non-hydrogen inorganic substance that is the same as a non-halogen inorganic substance of the inorganic halide. The reducing agents may include an inorganic substance whose electronegativity is less than an electronegativity of a non-halogen inorganic substance of the inorganic halide.

It is to be understood that both the foregoing general description and the following detailed description are exemplary and explanatory and are intended to provide further explanation of the invention as claimed.

BRIEF DESCRIPTION OF THE DRAWING

The accompanying drawing, which is included to provide a further understanding of the invention and is incorporated in and constitute a part of this specification, illustrates embodiments of the invention and together with the description serves to explain the principles of the invention.

In the drawing:

FIG. 1 is a representation of an exemplary apparatus that may be used to carry out the invention.

DETAILED DESCRIPTION OF THE ILLUSTRATED EMBODIMENTS

Reference will now be made in detail to an exemplary embodiment of the present invention illustrated in the accompanying drawing.

For the purposes of this application the term "halogen" is used to refer to those elements in group 7A of the periodic table, i.e. fluorine, chlorine, bromine, iodine and astatine. The term "halide" is used to refer to the anions or reduced form of these halogens when bonded to another element, i.e. fluoride, chloride, bromide, iodide and astatide.

Although the following detailed description contains many specific details for purposes of illustration, it is understood that one of ordinary skill in the art will appreciate that many examples, variations and alterations to the following details are within the scope and spirit of the invention. Accordingly the exemplary embodiments of the invention described herein are set forth without any loss of generality to, and without imposing limitations thereon, the claimed invention.

Because the reduction of inorganic fluorides tends to typically be the more difficult, for illustrative purposes only, inorganic fluorides are exemplified throughout this specification. It should be understood, however, that the same teachings are equally applicable to other inorganic halides even if it may not always be explicitly stated.

Also, although five elements are identified as belonging to the halogen group that fall within the scope of this invention: fluorine, chlorine, bromine, iodine, and astatine, preferred embodiments of the thermo-reducing reactions discussed below involve halogens with a melting point lower than the ambient temperature. This is because the bond the elements make with hydrogen is more stable than the bond made by the halogens with melting point higher than the ambient temperature. Of the five halogens identified above, the first three elements, i.e. fluorine, chlorine and bromine, have a melting point lower than the ambient temperature. The last two, iodine and astatine, have a melting point higher than the ambient temperature. The following is an example of the equilibrium equation for the hydrogen astatide where it is in equilibrium with the elements $At_2$ and $H_2$ is $2HAt \leftarrow\rightarrow At_2 + H_2$. Another example is for hydrogen iodine: $2HI \leftarrow\rightarrow I_2 + H_2$.

Also, for the purposes of this application the term "non-halogen inorganic substance(s)" is used to refer to the non-halogen species or compound of the inorganic halide(s) that is dehalogenated by the process described herein. This may include an elemental species or a compound. Thus, for example, if the inorganic halide is LiF, the non-halogen inorganic substance would be Li. Also, references made to hydrides of the synthesized "non-halogen inorganic substance(s)" are indicative of hydrides formed by the combination of hydrogen with the non-halogen species or compound found in the inorganic halide(s). In a similar manner, the term "non-hydrogen inorganic substance" when discussing the inorganic hydride reducing agents is used to indicate the non-hydrogen species or compound of the inorganic hydride, which include either an element or a compound, other than the hydrogen molecule(s).

The present technology relates to inorganic halide molecules that may contain a non-halogen inorganic substance and one to six halogen atoms. As discussed above, the inorganic halides within the scope of this invention may include inorganic fluorides, inorganic chlorides, inorganic bromides, inorganic iodides and inorganic astatides. Similarly, the halogen atoms may include fluorine, chlorine, bromine, iodine and astatine. In comparison with the prior art like Tumanov, the process of present invention may operate at a predicted temperature to obtain the total reduction of an inorganic halide such as inorganic fluoride.

Thus, in accordance with the present invention as described herein, it should be understood that the process described below in all of its permutations leads to at least one inorganic halide being fully reduced (or "completely reduced"). As explained in more detail below, this may result in the synthesis of a non-halogen inorganic substance from the inorganic halide. Alternatively, as also explained in further detail below, the reaction may result in the synthesis of an inorganic hydride with the non-halogen inorganic substance of the inorganic halide. When multiple inorganic halides are processed at the same time, the process described herein may result in the complete reduction of all inorganic halides. As explained further below, this may result in the synthesis of multiple non-halogen inorganic substances from the inorganic halides. As also explained further below, this may also result in the synthesis of one or more inorganic hydrides or a mixture of inorganic hydrides and non-halogen inorganic substances. Alternatively, at least one of the inorganic halides is fully reduced so as to synthesize at least one of a non-halogen inorganic substance or an inorganic hydride. In preferred embodiments, the reaction process also leads to the synthesis one or more anhydrous hydrogen halides.

The inorganic halide may be represented by the formula $MX_y$, where "y" may be from one to six. In an exemplary embodiment, the inorganic halide, such as an inorganic fluoride, is reacted with thermo-reducing agents such as molecular hydrogen, an inorganic hydride, and/or an inorganic metallic element.

The dehalogenation of the inorganic halide molecules by the thermo-reducing agent may take place in the reaction zone of a thermo-reducing reactor described in more detail below. Exemplary embodiments of the reaction can be represented by the following equations:

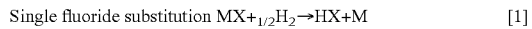

Single fluoride substitution $MX + \tfrac{1}{2}H_2 \rightarrow HX + M$    [1]

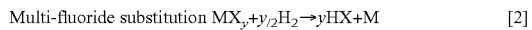

Multi-fluoride substitution $MX_y + y/2\,H_2 \rightarrow yHX + M$    [2]

where M represents a non-halogen inorganic substance, X represents halide, and $H_2$ represents molecular hydrogen. The above substitution equation is simply exemplary and should not be viewed as limiting. As indicated, M may be a non-halogen inorganic substance. For purposes of this description the term "substance" should be understood to include single elemental species and multi-element compounds.

The inventor discovered a method in which all the inorganic halide can be reduced. In preferred embodiments, the reduction of the inorganic halide leads to a non-halogen inorganic substance and/or hydride thereof and anhydrous hydrogen halide by the thermo-reducing reaction between inorganic halide and a reducing agent, preferably hydrogen, in the thermo-reducing reaction zone of a reactor.

In order to decompose the inorganic halide to a non-halogen inorganic substance and/or hydride thereof and anhydrous hydrogen halide, it is necessary to have enough hydrogen at a reaction temperature (reaction zone temperature) where the non-halogen inorganic substance of the inorganic halide is substituted by the reducing hydrogen.

The temperature of the reaction zone can be predicted as discussed in more detail below by knowing the electronegativity of the elements that react during the thermal reaction and the melting point and the boiling point of the non-halogen inorganic substance of the inorganic halide molecules.

In an exemplary embodiment, the invention correlates the electronegativity, melting point and boiling point of the non-halogen inorganic substances to the electronegativity of hydrogen and halogen. By the mechanism of a substitution reaction, the non-halogen inorganic substance of the inorganic halide can be substituted by the hydrogen, the non-halogen inorganic substance of the inorganic halide is freed from the halide and the hydrogen that takes the place of the non-halogen inorganic substance of the inorganic halide can form anhydrous hydrogen halide.

The reaction zone temperature can be within a range that falls between the melting point and the boiling point of the non-halogen inorganic substance of the inorganic halide.

The partial pressure of molecular hydrogen preferably will be higher than the partial pressure of the inorganic halide.

The anhydrous hydrogen halide from the substitution reaction may be at a temperature higher than the boiling point of the anhydrous hydrogen halide. Accordingly, the formed anhydrous hydrogen halide may flow out the reaction zone as super heated gas.

FIG. 1 is an illustration of an exemplary embodiment of an apparatus 100 that may be used in carrying out the invention. The following describes this apparatus in conjunction with a reaction involving hydrogen. However, as discussed herein, using molecular hydrogen as a reducing agent is only a preferred embodiment. As discussed below, other reducing agents may be used. Also, as discussed earlier, the same process may be used for different inorganic halides, such as inorganic fluoride, inorganic chloride, inorganic bromide, inorganic iodide and inorganic astatide. This description of the apparatus, therefore, is merely exemplary and should not be viewed as limiting.

This exemplary embodiment includes heat exchanger 10, heat exchanger 20, thermo-reducing reactor 30, flash separator 40 for the separation of anhydrous hydrogen halide and unreacted hydrogen from the inorganic substance, separator 50 for the separation of anhydrous hydrogen halide from the unreacted hydrogen, buster compressor 60 for recycling the unreacted hydrogen and the streams 71, 72, 73, 74, 75, 76, 77, 78, 79, 80 of the process plant.

The heat exchanger 10 may include heating means for preheating the inorganic halide inlet stream 71 with the preheated inorganic halide exiting as outlet stream 72 moving to inlet of thermo-reducing reactor 30.

The heat exchanger 20 may also have heating means to heat condition the hydrogen of stream 79, exiting as hydrogen stream 80 moving to inlet of thermo-reducing reactor 30. The inorganic halide stream 72 and the hydrogen stream 80 may make contact in thermo-reducing reactor 30.

The thermo-reducing reactor 30 is a vessel where the mixture of inorganic halide and molecular hydrogen may travel as the reaction of halohydrogenation takes place. The reaction may be complete by the time it reaches the other end of the thermo-reducing reactor 30. The thermo-reducing reactor 30 may be equipped with cooling means 81 and with heating means 82 to maintain the set temperature of the thermo-reducing reactor 30. The set temperature may be maintained in the thermo-reducing reactor 30 independent of the reaction being an exothermic reaction or an endothermic reaction.

In an exemplary embodiment, the shape of the thermo-reducing reactor 30 may be straight or a coil in a vertical position, but other shapes or positions can be used. The inlets of the thermo-reducing reactor 30 may be streams 72 and 80 in one end, preferably at the top, and outlet stream 73 at the opposite end of the thermo-reducing reactor 30.

The length of the thermo-reducing reactor may be sufficient for a complete reduction and conversion of all the halogen to anhydrous hydrogen halide. The material of construction of the thermo-reducing reactor 30 can be metallic compatible with the reactants and reaction products.

The flash separator 40 may be a vertical vessel with inlet stream 73 moving the reaction product from thermo-reducing reactor 30, outlet stream 76 for removing the inorganic substances fraction bottom of flash separator 40, and stream 74 moving the fraction containing the anhydrous hydrogen halide and the unreacted hydrogen to separator 50.

The separator 50 may be a vertical vessel with one lateral connection for the stream 74, a bottom connection for stream 75 for removing the anhydrous hydrogen halide and a connection at the top for moving the unreacted hydrogen stream 83. Separator 50 may further include a cooling means to prevent the anhydrous hydrogen halide to recycle.

A buster compressor 60 may be used to recycle the unreacted hydrogen stream back to heat exchanger 20 via unreacted hydrogen stream 77 connecting with stream 79.

Stream 78 connected with stream 79 may supply the molecular hydrogen necessary for reducing all the inorganic halide fed to thermo-reducing reactor 30.

In an exemplary embodiment the process of the present invention may be used to process inorganic fluoride of sulfur such as sulfur hexafluoride for the thermo-reducing synthesis of ultra high purity anhydrous hydrogen fluoride where the ultra high purity anhydrous hydrogen fluoride is obtained from the separation from elemental sulfur.

For the purposes of this specification, the term "ultra high purity" or "UHP" is used to reflect the meaning generally accepted in the art as standardized by all specialty gas companies, such as Matheson, Air Products, Union Carbide, Air Gas and others. The standardized definition for the term "ultra high purity" or "UHP" for gases means 99.999% pure, with total impurities equal to or less than 10 ppm.

Another exemplary embodiment provides a method for processing inorganic fluoride of nitrogen such as nitrogen trifluoride for the thermo-reducing synthesis of anhydrous ammonium fluoride rich in ammonia, which is a raw material used in the production of nitrogen trifluoride. Alternatively, in a preferred embodiment the reaction may use molecular hydrogen as the reducing agent to yield ultra pure anhydrous hydrogen fluoride in one step.

In a further exemplary embodiment the process may be used for processing inorganic fluoride of tungsten such as tungsten hexafluoride for the thermo-reducing synthesis of ultra high purity anhydrous hydrogen fluoride and elemental tungsten.

In another embodiment the process may be used for reducing inorganic fluoride of uranium, such as gaseous uranium hexafluoride, in a thermo-reducing synthesis of anhydrous hydrogen fluoride and elemental uranium. In this process, the reducing agent may include an inorganic metallic element such as calcium.

As discussed above, inorganic halides other than inorganic fluorides may also be processed. For example, the process may be used for reducing an inorganic chloride such as molybdenum chloride in a thermo-reducing reactor synthesis of anhydrous hydrogen chloride and elemental molybdenum.

Similarly, the process may be used to reduce an inorganic iodide. For example, tungsten iodide to synthesize anhydrous hydrogen iodide and elemental tungsten.

In another exemplary embodiment, the process may be used to reduce an inorganic bromide. For example, titanium bromide to yield for example elemental titanium and anhydrous hydrogen bromide. Another exemplary embodiment would be reducing an inorganic astatide. An example of this may be the reduction of molybdenum astatide to yield elemental molybdenum and preferably anhydrous hydrogen astatide. Anhydrous hydrogen astatide may be in equilibrium with astatine and hydrogen. The equilibrium equation would be:

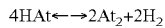

$$4HAt \leftrightarrow 2At_2 + 2H_2$$

These are only exemplary embodiments and should not be viewed as limiting. Any inorganic halide can be processed in accordance with the present invention independent of the inorganic metal found in the inorganic halide or of the halogen species found in the inorganic halide. Also, as explained in more detail below, while a preferred result is one where an anhydrous hydrogen halide is also produced, the invention is not so limited. In addition to the non-halogen inorganic substance from the inorganic halide the resulting products may include other inorganic halides in addition to or in place of anhydrous hydrogen halides.

Also, the process may be used to reduce multiple inorganic halides of different species at the same time. In an exemplary embodiment, the process may be used to reduce an inorganic fluoride at the same time as an inorganic chloride. Wherein the non-halogen inorganic substance of the inorganic fluoride may be the same or different from the non-halogen inorganic substance of the inorganic chloride. In another exemplary embodiment, the process may be used to reduce an inorganic fluoride at the same time as an inorganic bromide. Alternatively the process may be used to reduce a combination of inorganic bromide and inorganic chloride. The above combinations are only exemplary and should not be viewed as limiting. Other combinations may also be used. Also, as stated previously, the non-halogen inorganic substance found in each inorganic halide may be the same or different between the different inorganic halides. The result of such reduction process would depend on the species included in the inorganic halides. In accordance with the invention, the process of multiple inorganic halides could result in the synthesis of at least the non-halogen inorganic substances of each of the inorganic halides. In preferred embodiments, the synthesis of multiple inorganic halides would result in the non-halogen inorganic substances of each of the inorganic halides along with the anhydrous hydrogen halides corresponding to the each of the halides from the different inorganic halides.

The process of the present invention may include one or more reducing agents such as molecular hydrogen, an inorganic hydride, an inorganic metallic element or a combination thereof. In one exemplary embodiment the reducing agent may be molecular hydrogen ("$H_2$"). In another exemplary embodiment the reducing agent may be an inorganic hydride. Exemplary inorganic hydrides may be $H_2S$ or $LiH$. Other inorganic hydrides may also be used. Also, multiple inorganic hydrides may be used together as reducing agents. In yet another exemplary embodiment, the reducing agent may be an inorganic metallic element such as magnesium or calcium. Also, multiple inorganic metallic elements may be used contemporaneously as reducing agents. In yet another exemplary embodiment, the process may include more than one type of reducing agents. For example, the process may include molecular hydrogen and at least one inorganic hydride. Alternatively, the process may include molecular hydrogen and at least an inorganic metallic element as reducing agents. Also, the process may include at least an inorganic hydride and at least an inorganic metallic element as reducing agents. Lastly, the process may include the molecular hydrogen, at least an inorganic hydride and at least an inorganic metallic element as the reducing agents. Any of the above combinations may be acceptable. Also, any of the above combinations may be used any of the disclosed pressures discussed herein and at the reaction temperatures discussed in more detail below.

The selection of the different reducing agents may be based on their electronegativity, on their affinity to the halogen found in the inorganic halides being processed and/or on their reaction stability under the predetermined conditions. For example, as shown further below, in achieving the full decomposition of uranium hexafluoride, it is helpful to use calcium in conjunction with molecular hydrogen as the reducing agents. In considering the electronegativity, one could consider the electronegativity of the inorganic element of the reducing agent, such as that of the non-hydrogen inorganic substance in an inorganic hydride, and the electronegativity of the non-halogen inorganic substance of the inorganic halide. The affinity of a reducing agent for the halogens found in the inorganic halides can be determined based, among other things, on the reducing agent's electronegativity value relative to the electronegativity values of the other species in the reaction. It should be recognized, however, that affinity of a reducing agent to the halogens found in the inorganic halides may also depend on other properties and conditions that are known to those of skill in the art. Also, as stated above, the selection of a reducing agent may also be based on that reducing agent's stability under the given reaction conditions. Thus, the selection of the various reducing agents as exemplified throughout this disclosure should be viewed as merely exemplary and non-limiting.

Molecular hydrogen is a particularly effective and convenient reducing agent that may be used in exemplary embodiments of the present invention. The effectiveness of hydrogen is due to its reactivity in addition to its electronegativity. Molecular hydrogen may often be used effectively as the only reducing agent. This means that the reaction may be tailored so that no product other than anhydrous hydrogen halides and non-halogen inorganic substances are formed. Also, a high flow of molecular hydrogen gas can be used to carry out the hydrogen halide formed in the reaction zone. After the hydrogen halide is carried out from the reaction zone it can then be easily condensed to a liquid form. Finally, when using molecular hydrogen as the reducing agent, the dehalogenation reaction may take place at a temperature $T_{RZ}$ which, as explained in more detail below, can be easily determined and may be maintained higher than or equal to the melting point of the non-halogen inorganic substance of the inorganic halide and lower than the boiling point of the non-halogen inorganic substance of the inorganic halide.

The electronegativity value for various elements is well known to one of ordinary skill in the art. The Linus Pauling theory and the electronegativity scale, referred to as the Pauling Electronegativity Scale "PES", may be used to provide information about the energy of the molecules than intervene in the reaction of inorganic fluorides and the reducing agents to produces anhydrous hydrogen fluoride and non-halogen inorganic substances and/or hydrides thereof.

Linus Pauling noticed that the bond energy E[AB] in a molecule AB is always greater than the mean of the bond energies E[AA]+E[BB] in the homonuclear species AA and BB. In an "ideal" covalent bond, Linus Pauling theorized that E[AB] would be equal the mean of the bond energies E[AA]+ E[BB], and that the "excess" bond energy was caused by electrostatic attraction between the partially charged atoms in the heternuclear species AB. In effect, Linus Pauling was saying that the excess bond energy arises from an ionic contribution to the bond.

Linus Pauling managed to treat this ionic contribution by the equation:

$$E[AB] = \{E[AA] \times E[BB]\}0.5 + 96.48\{ZA - ZB\}2$$

In which E[AB] is expressed in kJ/mole [1 electron volt, 1 eV, =96.48 kJ/mole] and ZA−ZB represents the difference in "electronegativity" between the two elements, whose individual electronegativities are given the symbols ZA and ZB.

Using this equation, Pauling found that the largest electronegativity difference was between Cs and F.

Each element is defined to have a characteristic electronegativity ranging from 0.7 to 3.98 on the PES. On this scale, a strongly electronegative element such as fluorine will have a high electronegativity value, for example 3.98, while a weak electronegative element like lithium will have a very low value, for example 0.98. Fluorine is the most electronegative element and thus typically reacts with other substances to form various fluorides of different fluoride concentrations.

Electronegativity values tend to be higher for elements in the top right of the periodic table. Bonds between atoms with a large electronegativity difference (greater than or equal to 2.0 on the PES) are usually considered to be ionic while values between 2.0 and 0.4 are considered polar covalent. Values below 0.4 are considered non-polar covalent bonds.

In the present invention the PES may be used in selecting the reactant substances and the reaction products in accordance with a thermo-reducing synthesis. More specifically, the selection of reducing agents may be based on the electronegativity value of the inorganic element of the reducing agent and the electronegativity value of the non-halogen inorganic substance of the inorganic halide. In embodiments where the reducing agent is an inorganic metallic element, the electronegativity of the reducing agent is preferably less than the electronegativity of the non-halogen inorganic substance of the inorganic halide. In embodiments where the reducing agent is an inorganic hydride, the electronegativity of the non-hydrogen inorganic substance present in the inorganic hydride is preferably no greater than the electronegativity of the non-halogen inorganic substance of the inorganic halide. Thus, when using an inorganic hydride as a reducing agent, the non-hydrogen inorganic substance of the inorganic hydride may be the same non-halogen inorganic substance of the inorganic halide.

In an exemplary embodiment the reaction may be a intermolecular metathesis where the reducing agent is an inorganic metallic element, the electronegativity value of the non-halogen inorganic substance of the inorganic halide is preferably higher than the electronegativity value of the inorganic metallic element being used as the reducing agent. Although this reaction will reduce the inorganic halide to obtain the non-halogen inorganic substance from the inorganic halide, the reaction may also result in a new inorganic halide comprised of the combination of the halogen with the inorganic metallic element used as the reducing agent. An example of this reaction is $UF_4 + 2Ca \rightarrow U + 2CaF_2$. In this case the inorganic metallic element calcium is the reducing agent with a PES value of 1.0 and the non-halogen inorganic substance of the inorganic fluoride is uranium with a PES value of 1.38.

A similar intermolecular metathesis where the reducing agent is an inorganic hydride involves a similar relationship between the electronegativity of the non-halogen inorganic substance(s) of the inorganic halide(s) and the non-hydrogen inorganic substance of the inorganic hydride. An exemplary reaction is $SiF_4 + 4LiH \rightarrow SiH_4 + 4LiF$. This reaction completely reduced the silicon fluoride even though it forms a new fluoride. In this reaction the Li PES value=0.98 and the Si PES value=1.90, i.e. the electronegativity value of Si, the non-halogen inorganic substance of the inorganic fluoride, is greater than the electronegativity of the non-hydrogen inorganic substance of the reducing agent, in this case Li.

In yet another exemplary embodiment, when the reducing agent comprises an inorganic hydride, the non-hydrogen inorganic substance of the inorganic hydride may be the same as the non-halogen inorganic substance of the inorganic halide. In such instances, the reaction may still completely reduce the inorganic halide and produce anhydrous hydrogen halide and a non-halogen inorganic substance. Non-limiting, exemplary embodiments of reducing reactions where an inorganic hydride reducing agent comprises the same inorganic substance as the non-halogen inorganic substance of the inorganic halide are: $SiF_4$ and $SiH_4$ or $UF_6$ and $UH_3$ the reaction mechanisms of which are shown below:

$SiF_4 + SiH_4 \rightarrow 2Si + 4HF$ $UF_6 + 2UH_3 \rightarrow 3U + 6HF$ $SiCl_4 + SiH_4 \rightarrow 2Si + 4HCl$ $SiBr_4 + SiH_4 \rightarrow 2Si + 4HBr$ $SiI_4 + SiH_4 \rightarrow 2Si + 4HI$ $AsCl_3 + AsH_3 \rightarrow 2As + 3HCl$ $AsBr_3 + AsH_3 \rightarrow 2As + 3HBr$ $ZrBr_2 + ZrH_2 \rightarrow 2Zr + 2HBr$ $ZrI_2 + ZrH_2 \rightarrow 2Zr + 2HI$ $TiCl_4 + 2Mg \rightarrow Ti + 2MgCl_2$ $TiBr_4 + 2Mg \rightarrow Ti + 2MgBr_2$ In the present invention it is established that the raw materials used in the thermo-reducing synthesis may be inorganic fluorides selected from Table 1 below. Table 1 provides a summary of the atomic number, atomic weight, PES value, melting point and boiling point for each element.

TABLE 1

| Elements | Atomic Number [At. No.] | Atomic Weight [At. Wt.] | "PES" | Melting Point [$T_m$ °C.] | Boiling Point [$T_b$ °C.] |
|---|---|---|---|---|---|
| Hydrogen [H] | 1 | [1.00] | 2.20 | −259.1 | −252.7 |
| Lithium [Li] | 3 | [6.94] | 0.98 | 186.0 | 1136.0 |
| Beryllium [Be] | 4 | [9.00] | 1.57 | 1284.0 | 2767.0 |
| Boron [B] | 5 | [10.81] | 2.04 | 2300.0 | 2550.0 |
| Nitrogen [N] | 7 | [14.00] | 3.04 | 209.9 | 195.8 |
| Fluorine [F] | 9 | [19.00] | 3.98 | −223.0 | −187.0 |
| Sodium [Na] | 11 | [22.99] | 0.93 | 97.5 | 880.0 |
| Magnesium [Mg] | 12 | [24.31] | 1.31 | 651.0 | 1110.0 |
| Aluminum [Al] | 13 | [26.98] | 1.61 | 660.0 | 2056.0 |
| Silicon [Si] | 14 | [28.09] | 1.90 | 1420.0 | 2600.0 |
| Phosphorus [P] | 15 | [30.97] | 2.19 | | |
| Sulfur [S] | 16 | [32.06] | 2.58 | 120.0 | 444.6 |
| Potassium [K] | 19 | [39.00] | 0.82 | 62.3 | 760.0 |
| Calcium [Ca] | 20 | [40.00] | 1.00 | 810.0 | 1200.0 |
| Scandium [Sc] | 21 | [45.10] | 1.36 | 1200.0 | 2400.0 |
| Titanium [Ti] | 22 | [47.90] | 1.54 | 1800.0 | >3000.0 |
| Vanadium [V] | 23 | [50.95] | 1.63 | 1710.0 | 3000.0 |
| Chromium [Cr] | 24 | [52.00] | 1.66 | 1615.0 | 2200.0 |
| Manganese [Mn] | 25 | [54.93] | 1.55 | 1260.0 | 1900.0 |
| Iron [Fe] | 26 | [55.85] | 1.83 | 1535.0 | 3000.0 |
| Cobalt [Co] | 27 | [58.94] | 1.88 | 1480.0 | 2900.0 |
| Nickel [Ni] | 28 | [58.69] | 1.91 | 1452.0 | 2900.0 |
| Copper [Cu] | 29 | [63.59] | 1.90 | 1083.0 | 2300.0 |
| Zinc [Zn] | 30 | [65.38] | 1.65 | 419.4 | 907.0 |
| Arsenic [As] | 33 | [74.92] | 2.18 | 814.0 | 615.0 subl |
| Selenium [Se] | 34 | [78.96] | 2.55 | 220.0 | 688.0 |
| Rubidium [Rb] | 37 | [85.47] | 0.82 | 38.5 | 700.0 |
| Strontium [Sr] | 38 | [87.62] | 0.95 | 800.0 | 1150.0 |
| Yttrium [Y] | 39 | [88.92] | 1.22 | 419.4 | 907.0 |
| Zirconium [Zr] | 40 | [91.22] | 1.33 | 1700.0 | >2900.0 |
| Molybdenum [Mo] | 42 | [95.95] | 2.16 | 2620.0 | 3700.0 |
| Ruthenium [Ru] | 44 | [101.01] | 2.20 | 2400.0 | 2700.0 |
| Rhodium [Rh] | 45 | [102.91] | 2.28 | 1955.0 | >2500.0 |
| Palladium [Pd] | 46 | [106.40] | 2.20 | 1555.0 | 2200.0 |
| Silver [Ag] | 47 | [107.88] | 1.93 | 960.0 | 1950.0 |
| Cadmium [Cd] | 48 | [112.41] | 1.69 | 320.9 | 767.0 |
| Indium [In] | 49 | [114.76] | 1.78 | 155.0 | 1450.0 |
| Tin [Sn] | 50 | [118.70] | 1.96 | 231.8 | 2260.0 |
| Antimony [Sb] | 51 | [121.76] | 2.05 | 630.5 | 1380.0 |
| Tellurium [Te] | 52 | [127.60] | 2.10 | 452.0 | 1390.0 |
| Cesium [Cs] | 55 | [132.91] | 0.79 | 670.0 | |
| Barium [Ba] | 56 | [137.40] | 0.89 | 850.0 | 1140.0 |
| Cerium [Ce] | 58 | [140.30] | 1.12 | 645.0 | 1400.0 |
| Hafnium [Hf] | 72 | [178.60] | 1.30 | 1700.0 | 3200.0 |
| Tantalum [Ta] | 73 | [180.88] | 1.50 | 2800.0 | 4100.0 |
| Tungsten [W] | 74 | [183.92] | 2.36 | 3370.0 | 5900.0 |
| Rhenium [Re] | 75 | [186.30] | 1.90 | 3440.0 | |
| Osmium [Os] | 76 | [190.60] | 2.20 | 2700.0 | 5300.0 |
| Iridium [Ir] | 77 | [193.10] | 2.20 | 2350.0 | 4800.0 |
| Platinum [Pt] | 78 | [195.00] | 2.28 | 1755.0 | 4300.0 |
| Gold [Au] | 79 | [197.60] | 2.54 | 1063.0 | 2600.0 |
| Mercury [Hg] | 80 | [200.60] | 2.00 | −39.0 | 357.0 |
| Thallium [Tl] | 81 | [204.40] | 2.04 | 303.5 | 1650.0 |
| Lead [Pb] | 82 | [207.00] | 2.33 | 327.5 | 1620.0 |
| Bismuth [Bi] | 83 | [209.00] | 2.02 | 271.0 | 1450.0 |
| Astatine [At] | 85 | [211.00] | 2.20 | 302.0 | 337.0 |
| Radium [Ra] | 88 | [226.00] | 0.90 | 960.0 | 1140.0 |
| Thorium [Th] | 90 | [232.00] | 1.30 | 1840.0 | 3000.0 |
| Uranium [U] | 92 | [238.00] | 1.38 | 1133.0 | 3000.0 |
| Chlorine [Cl] | 17 | [35.45] | 3.16 | −100.98 | −34.6 |
| Bromine [Br] | 35 | [79.90] | 2.96 | −7.2 | 58.78 |
| Iodine [I] | 53 | [126.9] | 2.66 | 113.5 | 184 |

The reducing agents may include molecular hydrogen, inorganic hydrides and/or inorganic metallic elements also selected from Table 1.

It should be noted that the present invention does not relate to carbon containing substances such as hydrocarbons or oxygen containing substances such as oxides.

The inorganic halides and inorganic hydrides illustrated in the present invention may include all metals that react with the respective halogen. However, it should be noted that the conditions in which the reaction is carried out may vary depending on the selected species. For example, often a metal must be powdered to increase its surface area. Alkali metals, such as Li, Na, K, Rb, and Cs, all having a electronegativity value of less than 1.0, react with halogens violently, especially with fluorine, while the alkaline earth metals, such as Be, Mg and Ca, all having a electronegativity value equal to or greater than 1.0, react at room temperature and do not release much heat. The noble metals such as Ru, Ro, Pt, Pd and Au, all having a electronegativity value higher than 2.0, react least readily, requiring pure halogen gas at high temperatures. For example, these noble metals would require pure fluorine gas at temperatures in a range of 300° C. to 450° C. Other elements that react with halogen gases under special conditions are the noble gases, such as Kr, Xe, Ar and Rn (He and Ne do not react with halogens).

A non-exhaustive list of exemplary inorganic fluorides that may be selected for the present invention include: LiF, NaF, KF, $BeF_2$, $MgF_2$, $CaF_2$, $SrF_2$. $BaF_2$, $CoF_2$, $AgF_2$, $BF_3$, $AlF_3$, $PF_3$, $MnF_3$, $AsF_3$, $SbF_3$, $NF_3$, $CoF_3$, $SiF_4$, $GeF_4$, $GaF_4$, $TiF_4$, $TeF_4$, $UF_4$, $SF_4$, $MoF_4$, $WF_4$, $VF_5$, $AsF_5$, $SbF_5$, $PF_5$, $MoF_5$, $WF_5$, $WF_6$, $MoF_6$, $ReF_6$, $RoF_6$, $PdF_6$, $PtF_6$, $AuF_6$, $TeF_6$, $SeF_6$, $SF_6$, $CaF_2$ and $Na_3AlF_6$, $Na_2SiF_6$, and $H_2SiF_6$. It should be noted that this list only identifies some of the most common inorganic fluorides and that the list is merely exemplary. The use of other inorganic fluorides are not excluded from the invention.

Similar non-exclusive lists of exemplary inorganic halides other than fluorides that may be selected for the present invention are listed in the table below. As stated above, these lists only identify some of the most common inorganic halides other than fluorides and are merely exemplary. The use of other inorganic halides are not excluded from the invention.

| Chlorides | Bromides | Iodides | Astatides |
|---|---|---|---|
| LiCl | LiBr | LiI | LiAt |
| NaCl | NaBr | NaI | NaAt |
| KCl | KBr | KI | KAt |
| SrCl | SrBr | SrI | SrAt |
| CsCl | CsBr | CsI | CsAt |
| $YCl_3$ | $YBr_3$ | $YI_3$ | $YAt_3$ |
| $CaCl_2$ | $CaBr_2$ | $CaI_2$ | $CaAt_2$ |
| $ZrCl_3$ | $ZrBr_3$ | $ZrI_3$ | $ZrAt_3$ |
| $TiCl_4$ | $TiBr_4$ | $TiI_4$ | $TiAt_4$ |

Exemplary inorganic hydrides that may be selected for the purpose of this invention include: LiH, NaH, KH, RbH, CsH, $BeH_2$, $MgH_2$, $CaF_2$, $SrH_2$, $BaH_2$, $SeH_2$, $SH_2$, $TeH_2$, $B2H_6$, $AlH_3$, $PH_3$, $NH_3$, $AsH_3$, $GaH_3$, $UH_3$, $SiH_4$, $GeH_4$, $SnH_4$, $PbH_4$. This list is also simply exemplary of some of the most common inorganic hydrides. The use of other inorganic hydrides are not excluded by this invention.

In an exemplary embodiment, a thermo-reducing reactor may be used to carry out the process using an inorganic halide as a reactant and one or more of the above described reducing agents. The pressure in the reactor may be in the range of 1 atm to 30 atm. In an exemplary embodiment, the reactor is at a pressure 1 atm. In another exemplary embodiment the reactor is maintained at a pressure of 1 to 5 atm. In yet another embodiment the reactor is maintained at a pressure of 6 to 10 atm. In another exemplary embodiment the reactor is maintained at a pressure of 11 to 15 atm. In another exemplary embodiment the reactor is maintained at a pressure of 16 to 20 atm. In yet another exemplary embodiment the reactor is maintained at a pressure of 21 to 25 atm. In another exemplary embodiment the reactor is maintained at a pressure of 26 to 30 atm. In other exemplary embodiments, the reactor may be maintained at any pressure between 1 atm and 30 atm, such as, for example, 1 atm, 2 atm, 3 atm, 4 atm, 5 atm, 6 atm, 7 atm, 8 atm, 9 atm, 10, atm, 11 atm, 12 atm, 13 atm, 14 atm, 15 atm, 16 atm, 17 atm, 18 atm, 19 atm, 20 atm, 21 atm, 22 atm, 23 atm, 24 atm, 25 atm, 26 atm, 27 atm, 28 atm, 29 atm, or 30 atm. Any of the above pressures may be suitable for any reaction described herein and for any respective reaction temperature as determined in accordance with the explanation below. In other words, the temperature ranges described below may be independent of the system pressure. Unless otherwise stated, all specific examples and data provided herein are at a pressure of 1 atm. These values and information are merely exemplary.

The majority of the inorganic halides, inorganic hydrides and inorganic elements are solids at ambient temperature and atmospheric pressure. Molecular hydrogen and inerts, such as Helium, Neon, Argon and Nitrogen, are gases at ambient temperature and atmospheric pressure. Hydrogen halides are liquids or gaseous at ambient temperature and atmospheric pressure.

The thermo-reducing reactions of this invention may include multiphase reactions, where there may be a fraction of solid phase, a fraction of liquid phase and a fraction of gaseous phase at the temperature and pressure of the reaction zone. In the multiphase reactions the gaseous fraction or concentration and the partial pressure may depend on each other. The concentration of the gas component may be a function of the partial pressure of the gas component in the vapor phase. As the concentration of the gas component increases the partial pressure of the gas component increases. For practical purposes one may consider solids and liquids incompressible because increasing the pressure has a minor or no effect on the volume change. Thus, there are no changes in volume caused by changes in pressure. Gases on the other hand are compressible. Accordingly, changes in concentrations may induce changes in pressure and changes in temperature may induce changes in pressure.

The temperature in the reactor may be maintained in the range of 280K to 3800K. The temperature of the reactor may also be maintained at any reaction temperature as determined in accordance with the explanation provided in more detail below.

In embodiments where the reducing agent does not include molecular hydrogen and instead includes an inorganic metallic element and/or an inorganic hydride, the temperature of the reaction is preferably maintained to be greater than or equal to the melting point of the non-halogen inorganic substance of the inorganic halide and lower than the boiling point of the non-halogen inorganic substance of the inorganic halide.

The inventor discovered that when the reducing agent includes molecular hydrogen, either alone or in combination with an inorganic metallic element and/or an inorganic hydride, the temperature of the reaction may be related to the melting temperature and boiling temperature of the non-halogen inorganic substance of the inorganic halide and the electronegativity of the non-halogen inorganic substance of the inorganic halide and the electronegativity of hydrogen. These parameters are exemplified in Table 1 above.

In an exemplary embodiment, the formula that correlates the parameters from Table 1 above to determine the proper reaction temperature when the reducing agent includes molecular hydrogen is:

$$T_{RZ} = [E_e + E_H][T_m + T_b]/[\psi_x E_e + E_X]$$

wherein the $T_{RZ}$ is the temperature of the reaction zone for the reduction of inorganic fluorides, $T_m$ is the melting point of the non-halogen inorganic substance of the inorganic fluoride, $T_b$ is the boiling point of the non-halogen inorganic substance of the inorganic fluoride, $E_e$ represents the PES of the non-halogen inorganic substance of the inorganic fluoride, $E_H$ is the PES of hydrogen, $E_X$ is the PES of the halogen, and $\psi_x$ is a constant value relative to the halogen contained in the inorganic halide as explained below. All temperatures in the equation are in Kelvin.

The $\psi_x$ value in the above equation depends only the PES of the halogen found in the inorganic halide in accordance with the following equation:

$$\Sigma = \psi_x + E_X$$

wherein $6.10 \leq \Sigma \leq 6.25$, and $E_X$ is the PES of the halogen. For ease of reference, the range of $\psi_x$ values for each halogen is provided in Table 2 below.

| Element | PSE | Min $\psi_x$ | Max $\psi_x$ | Average $\psi_x$ |
|---|---|---|---|---|
| Fluorine [F] | 3.98 | 2.12 | 2.27 | 2.20 |
| Chlorine [Cl] | 3.16 | 2.94 | 3.09 | 3.02 |
| Bromine [Br] | 2.96 | 3.14 | 3.29 | 3.22 |
| Iodine [I] | 2.66 | 3.44 | 3.59 | 3.52 |
| Astatine [At] | 2.20 | 3.90 | 4.05 | 3.98 |

Using these values, the range of operation can then be defined by the following formula:

$$1.15[E_e + E_H][T_m + T_b]/[\psi_x E_e + E_X] \geq T_{RZ} \geq 0.85[E_e + E_H][T_m + T_b]/[\psi_x E_e + E_X]$$

wherein, the condition $T_m \leq T_{RZ} \leq T_b$ is also maintained.

The factors 1.15 and 0.85 in the above formula account for a 15% variation. In other words, the reaction temperature $T_{RZ}$ may be within 15% of the temperature value determined by the following equation:

$$T_{RZ} = [E_e + E_H][T_m + T_b]/[\psi_x E_e + E_X]$$

Taking an average value of 6.18 for E merely as an illustrative example, the $\psi_x$ would equal 6.18 minus the PES of the halogen. Thus, as shown in Table 2 above, for an E of 6.18, the $\psi_x$ for each halogen would be fluorine—2.20, chlorine—3.02, bromine—3.22, iodine—3.52, and astatine—3.98. Using these values as illustrative examples, when the inorganic halide is an inorganic fluoride the reaction temperature $T_{RZ}$ may be predetermined using the following formula.

$$1.15[E_e + E_H][T_m + T_b]/[2.20E_e + E_F] \geq T_{RZ} \geq 0.85[E_e + E_H][T_m + T_b]/[2.20E_e + E_F]$$

wherein $E_F$ is the PES of fluorine.

Similarly, for each of the other inorganic halogens the reaction temperature $T_{RZ}$ may be predetermined using one of the following formulas.

Inorganic Chloride:

$$1.15[E_e + E_H][T_m + T_b]/[3.02E_e + E_{Cl}] \geq T_{RZ} \geq 0.85[E_e + E_H][T_m + T_b]/[3.02E_e + E_{Cl}]$$

Inorganic Bromide:

$$1.15[E_e + E_H][T_m + T_b]/[3.22E_e + E_{Br}] \geq T_{R4} \geq 0.85[E_e + E_H][T_m + T_b]/[3.22E_e + E_{Br}]$$

Inorganic Iodide:

$$1.15[E_e + E_H][T_m + T_b]/[3.52E_e + E_I] \geq T_{RZ} \geq 0.85[E_e + E_H][T_m + T_b]/[3.52E_e + E_I]$$

Inorganic Astatide:

$$1.15[E_e + E_H][T_m + T_b]/[3.98E_e + E_{At}] \geq T_{RZ} \geq 0.85[E_e + E_H][T_m + T_b]/[3.98E_e + E_{At}]$$

wherein $E_{Cl}$, $E_{Br}$, $E_I$ and $E_{At}$ are the PES of chlorine, bromine, iodine and astatine respectively.

Further examples of determining the preferable temperature of the thermo-reducing reaction according to the present invention for inorganic halides reduced using molecular hydrogen wherein, $\psi_x$ values are derived from $\Sigma = 6.18$ are provided below. These examples are merely illustrative and non-limiting. As described above the $\psi_x$ have a value that falls within the ranges specified in Table 2, thus the reduction reactions can be performed within predetermined ranges.

For example, determining the preferable temperature of the thermo-reducing reaction according to a formula developed for thermo decomposition of nickel fluoride using molecular hydrogen as the reducing agent could be done with the below parameters.

Nickel fluoride=$NiF_2$
Nickel [Ni] non-halogen inorganic substance of the inorganic halide
Atomic Number of Nickel=28
Atomic Weight of Nickel=58.69
$E_{Ni}$=1.91
Tm of Nickel=1452° C.+273=1725K
Tb of Nickel=2900° C.+273=3173K
$E_H$=2.20
$E_F$=3.98
$\psi_F$=2.20
Using these parameters in the following formula:

$$T_{RZ} = [E_{Ni} + E_H][Tm + Tb]/[2.20E_{Ni} + E_F]$$

$$T_{RZ} = [1.91 + 2.20][1725 + 3173]/[2.20(1.91) + 3.98] = 2460.4K$$

which corresponds to 2187.4° C. Thus, in accordance with the above explanation, with $\psi_F$=2.20, $T_{RZ}$ must be within 15% of 2187.4° C. (i.e., in the range of 1859.29° C.-2515.51° C.). It is also noted that the requirement $T_m \leq T_{RZ} < T_b$ using the melting point temperature and boiling point temperature of Nickle (i.e., 1452° C. and 2900° C.) must also be met.

However, the above is simply an exemplary embodiment for this reaction. Because $\psi_F$ has a range of values between 2.12 and 2.27, as shown in Table 2 above, an appropriate reaction temperatures $T_{RZ}$ for this reaction can be more accurately be defined to fall in the range 2147.81° C.-2234.19° C. (±15%). Thus, the reaction temperature $T_{RZ}$ could be a low as 1825.64° C. or as high as 2569.32° C., also meeting the $T_m \leq T_{RZ} < T_b$ requirement using the melting point temperature and boiling point temperature of Nickel.

Similarly, an exemplary method to determine the preferable temperature of the thermo-reducing reaction according to a formula developed for thermo decomposition of sulfur hexafluoride as the inorganic fluoride using molecular hydrogen as the reducing agent may use the following parameters.

Sulfur hexafluoride=$SF_6$
Sulfur [S] non-halogen inorganic substance of the inorganic halide
Atomic Number of Sulfur=16
Atomic Weight of Sulfur=32.06
Tm of Sulfur=120° C.+273=393 K
Tb of Sulfur=444.6° C.+273=717.6 K
$E_S$=2.58
$E_H$=2.20
$E_F$=3.98
$\psi_F$=2.20
Using the following equation:

$$T_{RZ} = [E_S + E_H][Tm + Tb]/[2.20E_S + E_F]$$

$$T_{RZ} = [2.58 + 2.20][393 + 717.6]/[2.20(2.58) + 3.98]$$

$$T_{RZ} = 549.8° K$$

Which corresponds to 276.8° C.±15%. This temperature also meets the requirement $T_m \leq T_{RZ} < T_b$ using the melting point temperature and boiling point temperature of sulfur. Again, with $\psi_F$ having a range of values between 2.12 and 2.27, reaction temperatures that fall within 15% of the range 266.68° C. and 288.79° C. (inclusive) would also be appropriate and within the scope of the present invention as this more accurate range also meet the requirement $T_m \leq T < T_b$ using the melting point temperature and boiling point temperature of sulfur. This would indicate that the reaction zone is gaseous-liquid.

By way of further illustration, following are additional examples of other inorganics halides and $T_{RZ}$ calculated values using average $\psi_x$ values for the various halogens.

Inorganic halides of Molybdenum [Mo]:

$$E_{Mo} = 2.16$$

$$T_m = 2893K$$

$$T_b = 3973K$$

Molybdenum halide groups may include: molybdenum fluorides ($MoF_x$) such as $MoF_6$, $MoF_4$, and $MoF_2$; molybdenum chlorides ($MoCl_x$) such as $MoCl_6$, $MoCl_4$, $MoCl_2$; molybdenum bromides ($MoBr_x$) such as $MoBr_6$, $MoBr_4$, and $MoBr_2$; molybdenum iodides ($MoI_x$) such as $MoI_6$, $MoI_4$, and $MoI_2$; and molybdenum astatides ($MoAt_x$) such as $MoAt_6$, $MoAt_4$, and $MoAt_2$.

Applying the above formula:

$$T_{RZ}=[E_{Mo}+E_H][T_m+T_b]/[\psi_x E_{Mo}+E_x]$$

$$T_{RZ}=4.36(6866)/[\psi_x E_{Mo}+E_x]=29935.8/[\psi_x E_{Mo}+E_x]$$

The following $T_{RZ}$ values (in Kelvin) can be calculated for the various substances. These temperatures can easily be converted to degree Celsius by subtracting 273 from each value.

MoFx→$T_{RZ}$=29935.8/8.732=3428.3K

MoClx→$T_{RZ}$=29935.8/9.683=3091.6K

MoBrx→$T_{RZ}$=29935.8/9.915=3019.2K

MoIx→$T_{RZ}$=29935.8/10.263=2916.9K

MoAtx→$T_{RZ}$=29935.8/10.797=2772.6K

Inorganic halides of Tungsten [W]:

$E_W$=2.36

$T_m$=3643K $T_b$=6173K

Tungsten halide groups may include: tungsten fluorides ($WF_X$) such as $WF_6$, $WF_4$, and $WF_2$; tungsten chlorides ($WCl_X$) such as $WCl_6$, $WCl_4$, $WCl_2$; tungsten bromides ($WBr_X$) such as $WBr_6$, $WBr_4$, and $WBr_2$; tungsten iodides ($WI_X$) such as $WI_6$, $WI_4$, and $WI_2$; and tungsten astatide ($WAt_X$) such as $WAt_6$, $WAt_4$, and $WAt_2$.

Applying the above formula:

$$T_{RZ}=[E_W+E_H][T_m+T_b]/[\psi_x E_W+E_x]$$

$$T_{RZ}=4.56(9816)/[\psi_x E_W+E_x]=44760.96/[\psi_x E_W+E_x]$$

The following $T_{RZ}$ values (in Kelvin) can be calculated for the various substances. These temperatures can easily be converted to degree Celsius by subtracting 273 from each value.

WFx→$T_{RZ}$=44760.96/9.172=4880.17K

WClx→$T_{RZ}$=44760.96/10.287=4351.2K

WBrx→$T_{RZ}$=44760.96/10.559=4239.12K

WIx→$T_{RZ}$=44760.96/10.967=4081.42K

WAtx→$T_{RZ}$=44760.96/11.593=3861.0K

Inorganic halides of Tellurium [Te]:

$E_{Te}$=2.10

$T_m$=725K $T_b$=1623K

Tellurium halide groups may include: tellurium fluorides ($TeF_X$) such as $TeF_6$, $TeF_4$, and $TeF_2$; tellurium chlorides ($TeCl_X$) such as $TeCl_6$, $TeCl_4$, $TeCl_2$; tellurium bromides ($TeBr_X$) such as $TeBr_6$, $TeBr_4$, and $TeBr_2$; tellurium iodides ($TeI_X$) such as $TeI_6$, $TeI_4$, and $TeI_2$; and tellurium astatides ($TeAt_X$) such as $TeAt_6$, $TeAt_4$, and $TeAt_2$.

Applying the above formula:

$$T_{RZ}=[E_{Te}+E_H][T_m+T_b]/[\psi_x E_{Te}+E_x]$$

The following $T_{RZ}$ values (in Kelvin) can be calculated for the various substances. These temperatures can easily be converted to degree Celsius by subtracting 273 from each value.

TeFx→$T_{RZ}$=4.3(2348)/8.6=1174K

TeClx→$T_{RZ}$=10096.4/9.502=1062.5K

TeBrx→$T_{RZ}$=10096.4/9.722=1038.5K

TeIx→$T_{RZ}$=10096.4/10.052=1004.4K

TeAtx→$T_{RZ}$=4.30[2348]/10.558=956.3K

Inorganic halides of Titanium [Ti]:

$E_{Ti}$=1.54

$T_m$=2073K $T_b$=3273K

Titanium halide groups may include: titanium fluorides ($TiF_X$) such as $TiF_6$, $TiF_4$, and $TiF_2$; titanium chlorides ($TiCl_X$) such as $TiCl_6$, $TiCl_4$, $TiCl_2$; titanium bromides ($TiBr_X$) such as $TiBr_6$, $TiBr_4$, and $TiBr_2$; titanium iodides ($TiI_X$) such as $TiI_4$; and titanium astatide ($TiAt_X$).

Applying the above formula:

$$T_{RZ}=[E_{Ti}+E_H][T_m+T_b]/[\psi_x E_{Ti}+E_x]$$

$$T_{RZ}=[1.54+2.2][2073+3273]/[\psi_x E_{Ti}+E_x]$$

The following $T_{RZ}$ values (in Kelvin) can be calculated for the various substances. These temperatures can easily be converted to degree Celsius by subtracting 273 from each value.

TiFx→$T_{RZ}$=[3.74][5346]/[2.20(1.54)+3.98]=2568.5K

TiClx→$T_{RZ}$=18924.8/7.81=2423.2K

TiBrx→$T_{RZ}$=18924.8/7.919=2390K

TiIx→$T_{RZ}$=18924.8/8.081=2342K

TiAtx→$T_{RZ}$=18924.8/8.329=2272.1K

In addition to the above example, when reducing an inorganic halide containing more than one kind of halide species, the reaction temperature $T_{RZ}$ may be calculated based on the halide species present having the higher electronegativity value (PES). The selection of the highest electronegativity value of the halide element of the inorganic halide will help prevent any solid presence in the molten flux of the mixture.

Also, when reducing multiple inorganic halides using molecular hydrogen as at least one of the reducing agents, the reaction temperature $T_{RZ}$ may be calculated based on the information relating to the inorganic halide containing the halogen with the highest electronegativity value (PES). Thus, the melting and boiling point temperatures used in the $T_{RZ}$ equation would be those of the non-halogen inorganic substance of the inorganic halide containing the halogen with the highest electronegativity. Also, the electronegativity and $\psi_x$ values used in the $T_{RZ}$ equation would be those of the halogen with the highest electronegativity.

Similarly, when reducing multiple inorganic halides without molecular hydrogen as a reducing agent, (i.e. when only using one or more inorganic metallic elements and/or inorganic hydrides, or combinations thereof), the reaction temperature is maintained to be greater than or equal to the melting point of the non-halogen inorganic substance of the inorganic halide having the halogen with highest electronegativity and lower than the boiling point of the non-halogen inorganic substance of the inorganic halide having the halogen with the highest electronegativity.

Other control variables may include mass or concentration, partial pressure of the non-halogen inorganic substance of the inorganic halide, and total pressure.

Temperature and concentration can be two important variables in controlling the rate of reaction. Specifically, the concentration of the reducing agent and the temperature of the reaction zone can be used to modify the rate of reaction and, in some instances, even cause the reaction to reverse.

The rate of reaction may be increased with an increase in temperature. This is easily explained in terms of the Kinetic-molecular theory. As the temperature of the system is raised, the average velocity of the molecules becomes greater and more collisions between molecules per unit time result. In addition, as the temperature rises, more molecules gain the minimum energy necessary to allow a reaction to take place when they collide. In other words, at higher temperature a greater fraction of the molecules acquire energy to break the bonds that hold the atoms or radicals together, thus making possible other molecular combinations. For many reactions it appears that a rise in temperature increases the rate of reaction because the change in temperature increases the number of "activated" molecules (i.e., those molecules that possess the necessary energy of activation).

At a fixed temperature the rate of a given reaction in a mixture may also be affected by the concentration of the reacting substances. The increase in the reaction rate that accompanies an increase in concentration of the reacting substances is also readily explained in terms of the Kinetic-molecular theory. By increasing the concentration of all or any of the reacting substances, the chances for collision between molecules are increased due to the presence of a greater number of molecules per unit volume. More collisions per unit time results in a greater reaction rate.

Partial pressure may also be controlled. In an exemplary embodiment, the partial pressure of the non-halogen inorganic substance of the inorganic halide may be lower than 1 atm. Also, the partial pressure of the molecular hydrogen may be in the range of 1 to 9 times the partial pressure of the non-halogen inorganic substance of the inorganic halide at reaction temperature. Thus, for example, if the partial pressure of the non-halogen inorganic substance of the inorganic halide is 0.5 atm, the total pressure may be about 5 atm. The total pressure is a function of the summation of all the partial pressures for the entire gaseous component in the system.

Partial pressure at $T_{RZ}$ may be determined based on boiling point temperature of the species. For example, to determine the partial pressure of the Nickel element at the reaction temperature $T_{RZ}$ calculated above one may rely on the following analysis: if the boiling point of Ni=2900° C. then the vapor pressure of Nickel at 2900° C. is 1 atm or 760 torr. Based on this information, if $T_{RZ}$<Tb then it also follows that $P^0_{RZ}$<$P^0_b$. Thus, when $T_{RZ}$ is less than the boiling point of Nickel, the partial pressure of Ni at $T_{RZ}$ will also be lower than 1 atm or 760 torr. This means that at $T_{RZ}$ at least one of the components is gaseous, at least one component is liquid and the system can be maintained at a total pressure of about 1 atm [760 torr] by condensing the HF [boiling point 20° C. at 760 torr].

Molecular hydrogen is a gas, hydrogen halide may be a vapor or super heated vapor and the free non-halogen inorganic substance from the inorganic halide is liquid at $T_{RZ}$ greater than the melting point of the non-halogen inorganic substance of the inorganic halide. The system in the reaction zone may consist of gas phase, vapor phase, liquid phase and solid phase. The hydrogen gas may be blended with an inert gas such as nitrogen, helium or argon in order to keep the reactivity under control, and to maintain the turbulent flow through the reaction zone. The separation or removal of the anhydrous hydrogen halide from the reaction zone may be required to prevent a backward reaction between the free non-halogen inorganic substance of the inorganic halide and the hydrogen halide. Anhydrous hydrogen halide may be condensed and collected into a receiver as a liquid out of contact with any non-halogen inorganic substance of the inorganic halide.

Mass or concentration of a component in the gas phase would be proportional to the partial pressure.

The reaction products resulting from this process may include one or more anhydrous hydrogen halides and one or more non-halogen inorganic substances. It is noted that the process does not includes water or oxygen. Any anhydrous hydrogen halide produced in the reaction may be retrieve directly from the reduction of the inorganic halide.

To better control the reduction reaction when using molecular hydrogen as the reducing agent, it is possible to further mix in one or more inert gas. In an exemplary embodiment, the reducing molecular hydrogen gas may be mixed with one or more of helium, argon or nitrogen. By mixing in the inert gas with the reducing agent, it is possible to more easily decrease or increase the concentration of hydrogen in the gaseous mixture. The same technique may also be used with the other gaseous reducing agent as long as the additional gas species that is mixed in remains inert during the process.

The temperature in the thermo-reducing reactor may be set using a temperature controller. In an exemplary embodiment the temperature may be set in the thermo-reducing reactor by using a cooling means and heating means.

In another aspect, the embodiments provide a thermo-reducing reactor for the reduction of one more inorganic halides of the same group. For example, nitrogen as a non-halogen inorganic substance of the inorganic halide forms a group of inorganic fluorides. The group of nitrogen fluorides consists of molecules such as nitrogen trifluoride [$NF_3$], dinitrogen tetrafluoride [$N_2F_4$] and dinitrogen difluoride [$N_2F_2$]. Another example is sulfur, which as a non-halogen inorganic substance of the inorganic halide forms a group of inorganic fluorides. The group of sulfur fluorides consists of molecules such as sulfur hexafluoride [$SF_6$], sulfur tetrafluoride [$SF_4$], and sulfur difluoride [$SF_2$]. The thermo-reducing process can work for one or all the fluoride molecules of the same group. This can similarly occur for other halides. For example, example nitrogen trichloride, dinitrogen tetrachloride, and dinitrigen dichloride. Similar groups may also exist for inorganic bromides, inorganic iodides, and inorganic astatides.

EXEMPLARY EMBODIMENTS

The following discussion provides a series of exemplary reaction mechanisms that are covered by the present invention. It should be noted that these are simply exemplary and that the invention should not be viewed as limited to these exemplary embodiments.

The following inorganic fluorides are provided as exemplary inorganic halides discussed further below for the production of non-halogen inorganic substances and anhydrous hydrogen halide (in these cases anhydrous hydrogen fluoride): sulfur hexafluoride, nitrogen trifluoride, tungsten hexafluoride, and uranium hexafluoride.

The following reducing agents provide additional exemplary substances that may be used to carry out the invention described earlier: molecular hydrogen, inorganic hydrides, and inorganic metallic elements.

Additional sulfur fluoride groups that may be used include sulfur tetrafluoride, sulfur hexafluoride, sulfuryl fluoride and others. Similarly, additional nitrogen fluoride groups may be nitrogen trifluoride, tetrafluoro hydrazine, dinitrogen difluoride and others.

Each group of inorganic fluoride may be treated with molecular hydrogen in a thermo-reducing reactor under a range of temperature and pressure; such range being a function of the non-halogen inorganic substance of the group.

The thermo-reducing reactor may be operated with an excess of molecular hydrogen gas. The concentration of hydrogen is a function of the non-halogen inorganic substance of the inorganic halide.

In the case of sulfur hexafluoride one of the reducing agent may be molecular hydrogen or hydrogen sulfide:

$$SF_6 + 3H_2 \rightarrow 6HF + S$$

$$SF_6 + 3H_2S \rightarrow 6HF + 4S$$

In the case of nitrogen trifluoride one of the reducing agent that can be used is molecular hydrogen and ammonia [$NH_3$]:

$$2NF_3 + 3H_2 \rightarrow N_2 + 6HF$$

$$NF_3 + NH_3 \rightarrow 3HF + N_2$$

When ammonia and hydrogen fluoride are in contact they generate ammonium fluoride. The reaction of nitrogen trifluoride and hydrogen produces ultra high purity anhydrous hydrogen fluoride:

$$2NF_3 + 3H_2 \rightarrow N_2 + 6HF$$

In the case of tungsten hexafluoride the reducing agent may be molecular hydrogen and the gas phase reaction is:

$$WF_6 + 3H_2 \rightarrow W + 6HF$$

In the case of uranium hexafluoride the reducing agents may be molecular hydrogen and any inorganic metallic element with an electronegativity value lower than uranium's electronegativity value of 1.38, such as calcium. The reaction mechanism is as follows:

$$UF_6[gas] + H_2[gas] \rightarrow UF_4[s] + 2HF \text{ (prevents the hazard of gaseous U)}$$

$$UF_4[s] + Ca[s] \rightarrow U + 2CaF_2[s] \text{ (production of elemental U)}$$

Additional exemplary embodiments are also provided below for inorganic halides including chlorides, bromides, iodides, and astatides.

$$CoAt_2 + Ca \rightarrow Co + CaAt_2$$

$$MoAt_6 + 6Na \rightarrow Mo + 6NaAt$$

$$PdCl_6 + 6Li \rightarrow Pd + 6LiCl$$

$$WBr_4 + 4K \rightarrow W + 4KBr$$

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for the synthesis of anhydrous hydrogen halide and at least one non-halogen inorganic substance comprising: fully and anhydrously reacting one or more inorganic halides with only one reducing agent to produce anhydrous hydrogen halide and at least one non-halogen inorganic substance, wherein the reducing agent is hydrogen and wherein the reaction is carried out at a reaction zone temperature such that $T_m \leq T_{RZ} < T_b$, wherein $T_m$ is the melting point of the non-halogen inorganic substance, $T_{RZ}$ is the temperature of the reaction zone, and $T_b$ is the boiling point of the non-halogen inorganic substance.

2. The method of claim 1, wherein the one or more inorganic halides comprises an inorganic fluoride.

3. The method of claim 1, wherein the one or more inorganic halides comprises at least one of: inorganic chloride, inorganic bromide and inorganic iodide.

4. The method of claim 1, wherein the reaction is carried out at a reaction zone temperature that is within 15% of a temperature determined using the following formula:

$$T_{RZ} = [E_e + E_H][T_m + T_b] / [\psi_x E_e + E_x]$$

wherein the T is the temperature of the reaction zone;
$T_m$ is the melting point in Kelvin of the non-halogen inorganic substance of the inorganic halide;
$T_b$ is the boiling point in Kelvin of the non-halogen inorganic substance of the inorganic halide;
$E_e$ is the PES of the non-halogen inorganic substance of the inorganic halide;
$E_H$ is the PES of hydrogen;
$E_x$ is the PES of the halogen in the inorganic halide; and
$\psi_x$ is a value selected from a range determined by the following formula:

$$\Sigma = \psi_x + E_x$$

wherein $6.10 < \Sigma < 6.25$.

5. The method of claim 4 wherein the one or more inorganic halides are metal halides and the at least one non-halogen inorganic substance is a metal.

6. The method of claim 1, wherein the one or more inorganic halides comprises sulfur hexafluoride and the at least one non-halogen inorganic substance comprises elemental sulfur.

7. The method of claim 1, wherein the one or more inorganic halides comprises nitrogen trifluoride and the at least one non-halogen inorganic substance comprises nitrogen.

8. The method of claim 1, wherein the one or more inorganic halides comprises tungsten hexafluoride and the at least one non-halogen inorganic substance comprises elemental tungsten.

9. The method of claim 1, wherein the one or more inorganic halides comprises uranium hexafluoride and the at least non-halogen inorganic substance comprises elemental uranium.

10. The method of claim 1 wherein the one or more inorganic halides are metal halides and the at least one non-halogen inorganic substance is a metal.

11. A method for the synthesis of anhydrous hydrogen fluoride and at least one non-halogen inorganic substance comprising: anhydrously reacting one or more inorganic fluorides with only one reducing agent to produce anhydrous hydrogen fluoride and at least one non-halogen inorganic substance, wherein the reducing agent is hydrogen and wherein the reaction is carried out at a reaction zone temperature such that $T_m \leq T_{RZ} \leq T_b$, wherein $T_m$ is the melting point of the non-halogen inorganic substance, $T_{RZ}$ is the temperature of the reaction zone, and $T_b$ is the boiling point of the non-halogen inorganic substance.

12. The method of claim 11, wherein the reaction is a thermo-reducing reaction, and wherein a reaction zone temperature is within 15% of a temperature determined using the following formula:

$$T_{RZ} = [E_e + E_H][T_m + T_b] / [\psi_F E_e + E_F]$$

wherein the $T_{RZ}$ is the temperature of the reaction zone;

$T_m$ is the melting point in Kelvin of the non-halogen inorganic substance of the inorganic fluoride;

$T_b$ is the boiling point in Kelvin of the non-halogen inorganic substance of the inorganic fluoride;

$E_e$ is the PES of the non-halogen inorganic substance of the inorganic fluoride;

$E_H$ is the PES of hydrogen;

$E_F$ is the PES of fluorine; and $\psi_F$ is a value selected from a range determined by the following formula:

$$\Sigma = \psi_F + E_F$$

wherein $6.10 \leq \Sigma \leq 6.25$.

13. The method of claim 12, wherein $\psi_F$ is 2.20 and the thermo-reducing reaction is conducted in a thermo-reducing reactor.

14. The method of claim 12, wherein the one or more inorganic fluorides are metal fluorides and the at least one non-halogen inorganic substance is a metal.

15. The method of claim 11, wherein the one or more inorganic fluorides comprise uranium hexafluoride, and the at least one non-halogen inorganic substance is elemental uranium.

16. The method of claim 11, wherein the one or more inorganic fluorides are metal fluorides and the at least one non-halogen inorganic substance is a metal.

* * * * *